US012166281B2

(12) United States Patent
Russo

(10) Patent No.: US 12,166,281 B2
(45) Date of Patent: Dec. 10, 2024

(54) MICROSTRIP ANTENNA DEVICE WITH SLOT-LINE-FED ANTENNA ARRAYS

(71) Applicant: HUAWEI TECHNOLOGIES CO., LTD., Shenzhen (CN)

(72) Inventor: Ivan Russo, Segrate (IT)

(73) Assignee: Huawei Technologies Co., Ltd., Shenzhen (CN)

( * ) Notice: Subject to any disclaimer, the term of this patent is extended or adjusted under 35 U.S.C. 154(b) by 157 days.

(21) Appl. No.: 17/960,642

(22) Filed: Oct. 5, 2022

(65) Prior Publication Data

US 2023/0031609 A1 Feb. 2, 2023

Related U.S. Application Data

(63) Continuation of application No. PCT/EP2020/059876, filed on Apr. 7, 2020.

(51) Int. Cl.
*H01Q 21/00* (2006.01)
*H01Q 5/35* (2015.01)
*H01Q 13/20* (2006.01)

(52) U.S. Cl.
CPC ........... *H01Q 21/0075* (2013.01); *H01Q 5/35* (2015.01); *H01Q 13/206* (2013.01)

(58) Field of Classification Search
CPC ........... H01Q 21/0006; H01Q 21/0075; H01Q 21/06; H01Q 21/061; H01Q 21/065;
(Continued)

(56) References Cited

U.S. PATENT DOCUMENTS 4,063,245 A 12/1977 James et al.
4,291,277 A 9/1981 Davis et al.
(Continued)

FOREIGN PATENT DOCUMENTS

DE 3628435 C1 2/1988
JP 2004221877 A 8/2004
(Continued)

OTHER PUBLICATIONS

Zhang et al., "Millimeter-Wave Microstrip Comb-Line Antenna Array for Automotive Radar," 2018 12th International Symposium on Antennas, Propagation and EM Theory (ISAPE), Total 3 pages, XP033514781, Institute of Electrical and Electronics Engineers, New York, New York (Dec. 3-6, 2018).
(Continued)

*Primary Examiner* — Jason M Crawford

(74) *Attorney, Agent, or Firm* — Leydig, Voit & Mayer, Ltd.

(57) ABSTRACT

The present disclosure provides a microstrip antenna device, which may comprise a center-fed antenna array. Further, the present disclosure provides a radar device, which comprises the antenna device, and a method for fabricating the antenna device. The antenna device comprises a substrate with top and bottom surface, two-dimensional first and second conductive structures, which are arranged adjacent to each other on the top surface, and a two-dimensional third conductive structure, arranged on the bottom surface and providing an electric ground plane. The first conductive structure comprises a first array of antennas and a first feed network, and the second conductive structure comprises a second array of antennas and a second feed network. Further, a slot line is formed in the third conductive structure, for feeding a signal to the first feed network and to the second feed network.

20 Claims, 13 Drawing Sheets

(58) Field of Classification Search
CPC .......... H01Q 21/08; H01Q 5/35; H01Q 5/357; H01Q 5/371; H01Q 13/206; H01Q 1/38
See application file for complete search history.

(56) References Cited

U.S. PATENT DOCUMENTS

| | | | | |
|---|---|---|---|---|
| 4,761,654 A * | 8/1988 | Zaghloul | H01Q 9/0457 343/700 MS |
| 5,017,931 A * | 5/1991 | Carlyon | H01Q 21/08 343/824 |
| 5,422,649 A | 6/1995 | Huang | |
| 7,868,828 B2 * | 1/2011 | Shi | H01Q 21/0006 343/893 |
| 8,446,323 B2 | 5/2013 | Weidmann et al. | |
| 10,575,396 B2 * | 2/2020 | Shiozaki | H05K 1/0242 |
| 2003/0122715 A1 * | 7/2003 | Aikawa | H01Q 21/065 343/700 MS |
| 2003/0201941 A1 * | 10/2003 | Aikawa | H01Q 21/064 343/770 |
| 2003/0201944 A1 * | 10/2003 | Aikawa | H01Q 21/064 343/770 |
| 2004/0041732 A1 * | 3/2004 | Aikawa | H01Q 9/0457 343/700 MS |
| 2005/0264450 A1 * | 12/2005 | Nishiyama | H01Q 21/065 343/846 |
| 2007/0279303 A1 * | 12/2007 | Schoebel | H01Q 21/22 343/700 MS |
| 2009/0309804 A1 * | 12/2009 | Chen | H01Q 21/0075 343/893 |
| 2010/0225539 A1 * | 9/2010 | Margomenos | G01S 7/032 342/373 |
| 2012/0112976 A1 * | 5/2012 | Hayakawa | H01Q 9/045 343/843 |
| 2016/0248159 A1 * | 8/2016 | Shiozaki | H01Q 13/206 |
| 2017/0005405 A1 * | 1/2017 | Kim | H01Q 13/206 |
| 2018/0279466 A1 * | 9/2018 | Shiozaki | H01Q 1/38 |
| 2019/0089069 A1 * | 3/2019 | Niroo | H01Q 13/10 |
| 2021/0005978 A1 * | 1/2021 | Pourmousavi | H01Q 21/065 |
| 2022/0069455 A1 * | 3/2022 | Tang | H01Q 1/38 |
| 2023/0031609 A1 * | 2/2023 | Russo | H01P 5/1007 |

FOREIGN PATENT DOCUMENTS

| | | |
|---|---|---|
| JP | 2005340939 A | 12/2005 |
| JP | 2019047238 A | 3/2019 |
| KR | 101664389 B1 | 10/2016 |

OTHER PUBLICATIONS

H. Moheb et al., "Design of 24 GHz Microstrip Travelling Wave Antenna for Radar Application," IEEE Antennas and Propagation Society International Symposium. 1995 Digest, pp. 350-353, Institute of Electrical and Electronics Engineers, New York, New York (Jun. 18-23, 1995).
Zhang et al., "Microstrip Grid and Comb Array Antennas," IEEE Transactions on Antennas and Propagation, vol. 59, No. 11, pp. 4077-4084, Institute of Electrical and Electronics Engineers, New York, New York (Nov. 2011).

* cited by examiner (a)

(b)

(b)

(a)

MICROSTRIP ANTENNA DEVICE WITH SLOT-LINE-FED ANTENNA ARRAYS

CROSS-REFERENCE TO RELATED APPLICATIONS

This application is a continuation of International Application No. PCT/EP2020/059876, filed on Apr. 7, 2020, the disclosure of which is hereby incorporated by reference in its entirety.

TECHNICAL FIELD

The present disclosure relates to antenna devices, in particular, to microstrip antenna devices. The present disclosure provides a microstrip antenna device with a slot line-fed antenna array, and in some embodiments, with a center-fed antenna array. Further, the present disclosure provides a radar device, which comprises such a microstrip antenna device, and additionally provides a method for fabricating such a microstrip antenna device.

BACKGROUND

Multiple Input-Multiple Output (MIMO) radars usually exploit, at each physical Receive (Rx) or Transmit (Tx) channel, microstrip antenna devices including microstrip series-fed antenna arrays with an edge input feed. Such antenna arrays are simple to manufacture and relatively cost-effective. There are two different types of series-fed antenna arrays: travelling wave and standing wave. The first type uses a termination load that inhibits backward reflections, whilst the latter type does not use terminations, hence a standing wave across the array rises as effect of the combination of direct and reflected wave. In both approaches, feeding currents between the series antennas radiate a relatively high cross-polarized component of the electromagnetic field. In addition, both approaches suffer from a frequency-dependent direction of the main beam. Other issues are related to a strong dependency of the radiation and input impedance characteristics on temperature variations, etching, and dielectric tolerances, causing a lowering of the yield in mass production.

Edge-fed antenna arrays typically exploit a number of open stubs that populate a single column. The columns are conductively connected at one edge to a parallel microstrip feeding network. The latter is a sequence of Tee-junctions, which end up to a common input microstrip feed. Referring to FIG. 12, there is shown a microstrip antenna device including a typical edge-fed combline array. The microstrip antenna device comprises an insulating substrate with a conductive ground plane adhered to the undersurface thereof, and comprises a pattern of etched printed circuitry on the obverse, major surface of the substrate.

The microstrip antenna device of FIG. 12, which is provided as an example, radiates a horizontally polarized electric field as main polarization. The number of antennas and columns of antennas could be either even or odd, depending on the desired radiation properties. A microstrip feed at the center of the array is extremely difficult to be implemented, due to the lack of room. Further, it is also inefficient, due to unwanted radiation from the feed, and strong coupling to the central antennas of the array. In particular, the approach of using a microstrip edge feed makes the design, manufacturing, and integration to external components relatively easy and also the prototyping is cost-effective. However, the approach also leads to an unwanted frequency-dependent direction of the main beam, due to a variation of the relative phase associated to the feeding currents at each pair of elements.

A configuration that tried to solve these issues of a pure edge feed, introduced a microstrip antenna device with a hybrid edge/center array excitation and interleaved microstrip transmission lines. An arrangement of an interleaved comb antenna with double feeding was exploited by means of long microstrip lines, which are conductively connected to the center and sides of the array, as illustrated in FIG. 13. However, the very long microstrip feeding lines still introduce some problems, which are typical of microstrip line networks, especially at K-band and above. In particular, there are intrinsic high losses, due to the long microstrip lines and strong cross-coupling among parallel microstrip branches, aside from a non-negligible spurious radiation that distorts the final radiated pattern from the array and increases the radiated cross-polarized component.

A further attempt to solve the problem of the unbalanced edge-feed configuration proposed a microstrip antenna device with a double interdigitated configuration of unbalanced comb array groups, in order to obtain an overall balancing effect of the radiation pattern, and to reduce tolerance to temperature and manufacturing variations. However, even though this approach achieves a simple and co-planar feeding (i.e., only one insulating substrate is required), two or more inputs are required, thus making interconnection to external components much more challenging and the overall feeding network highly lossy.

SUMMARY

In view of the above-mentioned problems and disadvantages, embodiments of the present disclosure aim to improve the conventional microstrip antenna devices. A microstrip antenna device is provided with a better radiation performance, in particular, wherein an unwanted frequency-dependent direction of the main beam is suppressed. To this end, an improved feeding configuration is desired. In particular, a more balanced feeding of the antenna array of the microstrip antenna device is desired. Ideally, a solution enabling center feeding of the antenna array is desired. In addition, the feeding configuration in the microstrip antenna device should show low losses. A fabrication of the microstrip antenna device should also be of low complexity. Further, a dependency of the radiation and input impedance characteristics on temperature variations, etching, and dielectric tolerances, should be small, in order to enable high yield in mass production of the microstrip antenna device.

A first aspect of the disclosure provides a microstrip antenna device comprising: a substrate having a top surface and a bottom surface, a two-dimensional first conductive structure and a two-dimensional second conductive structure, arranged adjacent to each other on the top surface of the substrate, and a two-dimensional third conductive structure, arranged on the bottom surface of the substrate and providing an electric ground plane, wherein the first conductive structure comprises a first array of antennas and a first feed network, each of the antennas in the first array being connected to the first feed network, the second conductive structure comprises a second array of antennas and a second feed network, each of the antennas in the second array being connected to the second feed network, wherein a slot line is formed in the third conductive structure, for feeding a signal to the first feed network and to the second feed network.

Together, the first array of antennas and the second array of antennas may form an antenna array of the microstrip antenna device of the first aspect. The slot line is able to feed this antenna array. Due to the slot line feeding, radiation characteristics of the microstrip antenna device are improved. In particular, a more balanced feeding of the antenna array becomes possible. As a consequence, an unwanted frequency-dependent direction of the main beam of the antenna device can be suppressed. The microstrip antenna device of the first aspect also shows low losses, is easy to manufacture, and thus may enjoy high yield in mass production.

In an implementation form of the first aspect, the first feed network and the second feed network are electromagnetically coupled to the slot line in a coupling region.

Due to the slot line arrangement, the location of the coupling region with respect to the antenna array comprising the first array of antennas and the second array of antennas can be flexibly selected. This enables various designs of the microstrip antenna device, and enables reducing the unwanted frequency-dependent direction of the main beam.

In an implementation form of the first aspect, the coupling region is located between the first and the second array of antennas.

Thus, the antenna array comprising the first and the second array of antennas can be fed in a balanced manner.

In an implementation form of the first aspect, the coupling region is located centrally between the first and the second array of antennas.

Thus, a center-fed antenna array, comprising the first and second array of antennas, can be realized.

In an implementation form of the first aspect, the slot line is coupled to the first feed network and the second feed network, in the coupling region, via a coupling structure, and the coupling structure comprises a coupling portion of the slot line, a coupling portion of the first feed network and a coupling portion of the second feed network.

In an implementation form of the first aspect, the coupling structure comprises a cross-over coupler.

In an implementation form of the first aspect, the coupling portion of the slot line comprises an end portion of the slot line, said end portion having a circular shape, the coupling structure of the first feed network comprises an end portion of the first feed network, said end portion terminating in a first curved stub, and the coupling structure of the second feed network comprises an end portion of the second feed network, said end portion terminating in a second curved stub, wherein the curved stubs and the end portion have the same curvature.

In an implementation form of the first aspect, the first curved stub and the second curved stub are located above an inner region of the circular shape of the end portion of the slot line.

The coupling structure of the above implementation forms achieves very good electromagnetic coupling between the slot line and the feeding networks, and provides advantages in terms of easiness of manufacturing and cost-effectiveness. The coupling structure also enables a fully balanced radiating circuitry, and thus improved radiation characteristics of the microstrip antenna device.

In an implementation form of the first aspect, the first feed network comprises a primary feed line and a plurality of secondary feed lines, the primary feed line passing through a central region of the first array of antennas, and the secondary feed lines branching off from the primary feed line at different branch-off points, and wherein the second feed network comprises a primary feed line and a plurality of secondary feed lines, the primary feed line passing through a central region of the second array of antennas, and the secondary feed lines branching off from the primary feed line at different branch-off points.

In an implementation form of the first aspect, the coupling region is a first coupling region and the microstrip antenna device further comprises: a transmission line arranged on the top surface of the substrate, wherein the transmission line is connectable to a feeder for the microstrip antenna device; and the transmission line is electromagnetically coupled to the slot line in a second coupling region, in particular via a second coupling structure.

Thus, the slot line may provide a terminal to an integrated distribution line or external array feeder.

In an implementation form of the first aspect, the first and the second array of antennas are symmetric to each other with respect to a symmetry axis.

Thus, a symmetric antenna array comprising the first and second array of antennas can be provided.

In an implementation form of the first aspect, the coupling structure is configured to introduce a 180° phase shift between the signal in the first feed network and the signal in the second feed network.

This enables a fully balanced radiation characteristic of the antenna array comprising the first and second array of antennas.

In an implementation form of the first aspect, the slot line extends along the symmetry axis.

In an implementation form of the first aspect, the first conductive structure and the second conductive structure are separated from each other by a distance in a range of 0.7-0.85 times a wavelength of operation of the microstrip antenna device, in particular 0.76-0.82 times the wavelength of operation.

In an implementation form of the first aspect, the first array of antennas and the second array of antennas are both spatially periodic in a direction orthogonal to the slot line, with a spatial period in a range of 0.5-0.65 times the wavelength of operation of the microstrip antenna device.

Below 0.5 times the wavelength, the excessively close proximity between antennas on the same conductor would increase the mutual coupling, leading to a loss in the radiation and aperture efficiencies and, thus, to reduced gain.

In an implementation form of the first aspect, the antennas of the first array are arranged in a first lattice and the antennas of the second array are arranged in a second lattice.

In an implementation form of the first aspect, each of the first array and the second array is a microstrip combline antenna array.

Thus, also a combline antenna array comprising the first array and the second array is formed.

A second aspect of the present disclosure provides a radar device comprising a microstrip antenna device according to the first aspect or any implementation form thereof.

The radar device may comprise a radar transmitter, a radar received, or a radar transceiver. The radar device enjoys the above-described advantages of the microstrip antenna device of the first aspect.

A third aspect of the present disclosure provides a method for producing a microstrip antenna device, the method comprising: forming a two-dimensional first conductive structure and a two-dimensional second conductive structure adjacent to each other on a top surface of a substrate, the first conductive structure comprising a first array of antennas and a first feed network, the second conductive structure comprising a second array of antennas and a second feed network, each of the antennas in the first array being connected to the first feed network, each of the antennas in the second array being connected to the second feed network, and forming a two-dimensional third conductive structure on a bottom surface of the substrate in order to provide an electric ground plane, wherein forming the two-dimensional third conductive structure comprises: forming a conductive layer on the bottom surface of the substrate, and forming a slot line in the conductive layer, the slot line being suitable for feeding a signal to the first feed network and to the second feed network.

The conductive layer may be a metal layer. The metal layer may be formed by metallizing the bottom surface or part of the bottom surface. The microstrip antenna device is easy to fabricate with the method of the third aspect.

In summary, the aspects and implementation forms (embodiments of the disclosure) challenge the above-described problems of the edge-feed, by exploiting a different, e.g. central, excitation approach with very weak perturbation. The proposed feeding configuration using the slot line provides the benefit of a symmetrization of the antenna array's radiative performance on both azimuth and elevation cuts.

The embodiments of the disclosure may apply, in general, both to a fully-symmetrical architecture of the first and second array (horizontal and vertical planes) and to first and second arrays with partially symmetric geometry (only vertical plane). Embodiments of the disclosure rely on integrating the slot line feeder directly underneath the radiating section (first and second array) and into the arrays' ground plane. The embedded slot line feed does not introduce any relevant perturbations to the performances of the first and second arrays of antennas, and thus the antenna array formed by these array, compared to long microstrip co-planar solutions, and maintains an overall very simple stack-up.

It has to be noted that all devices, elements, units and means described in the present disclosure could be implemented in the software or hardware elements or any kind of combination thereof. All steps which are performed by the various entities described in the present disclosure as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above described aspects and implementation forms will be explained in the following description of specific embodiments in relation to the enclosed drawings, in which.

DETAILED DESCRIPTION OF EMBODIMENTS

Figure 1:
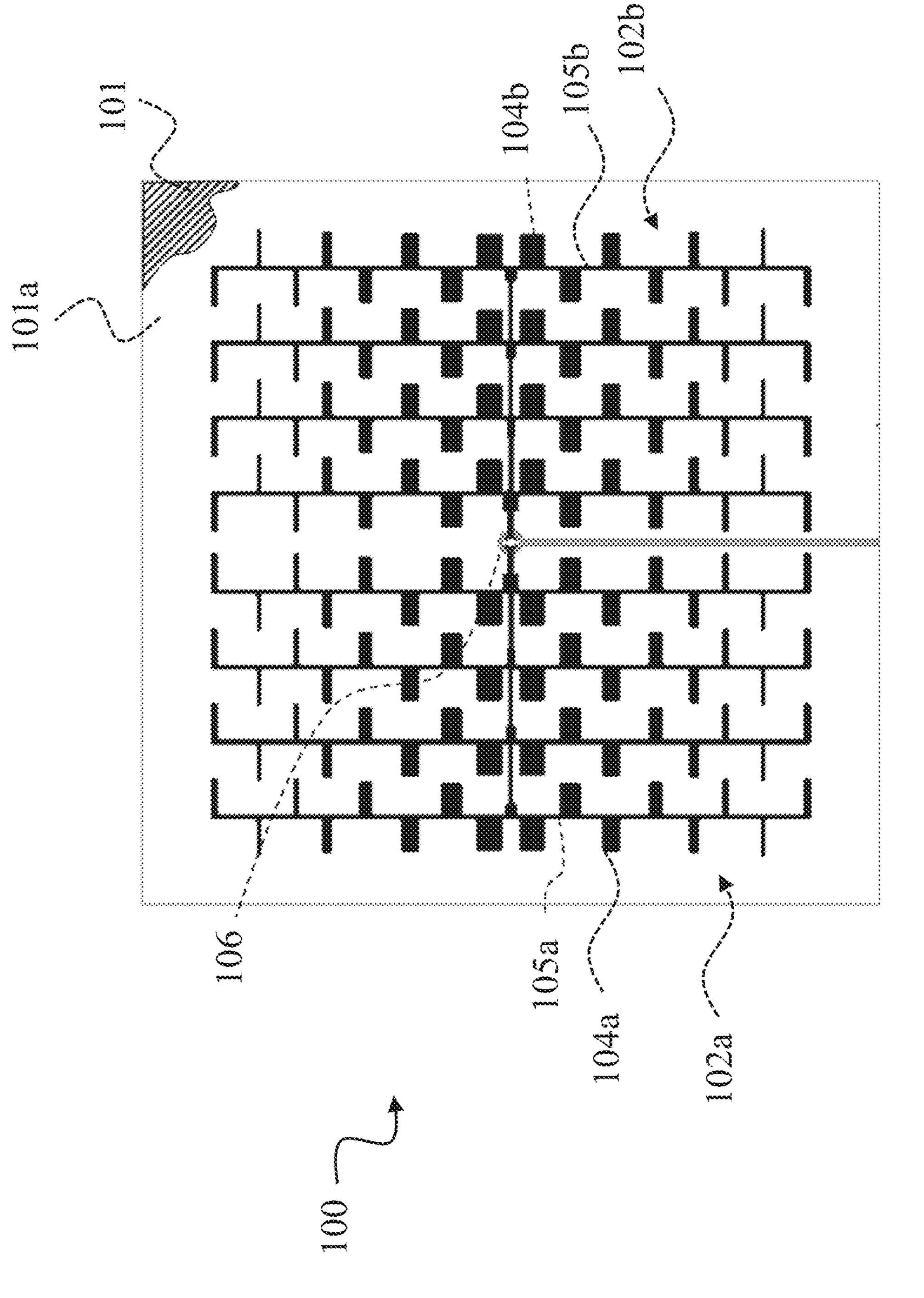
FIG. 1 shows a microstrip antenna device according to an embodiment.
Figure 2:
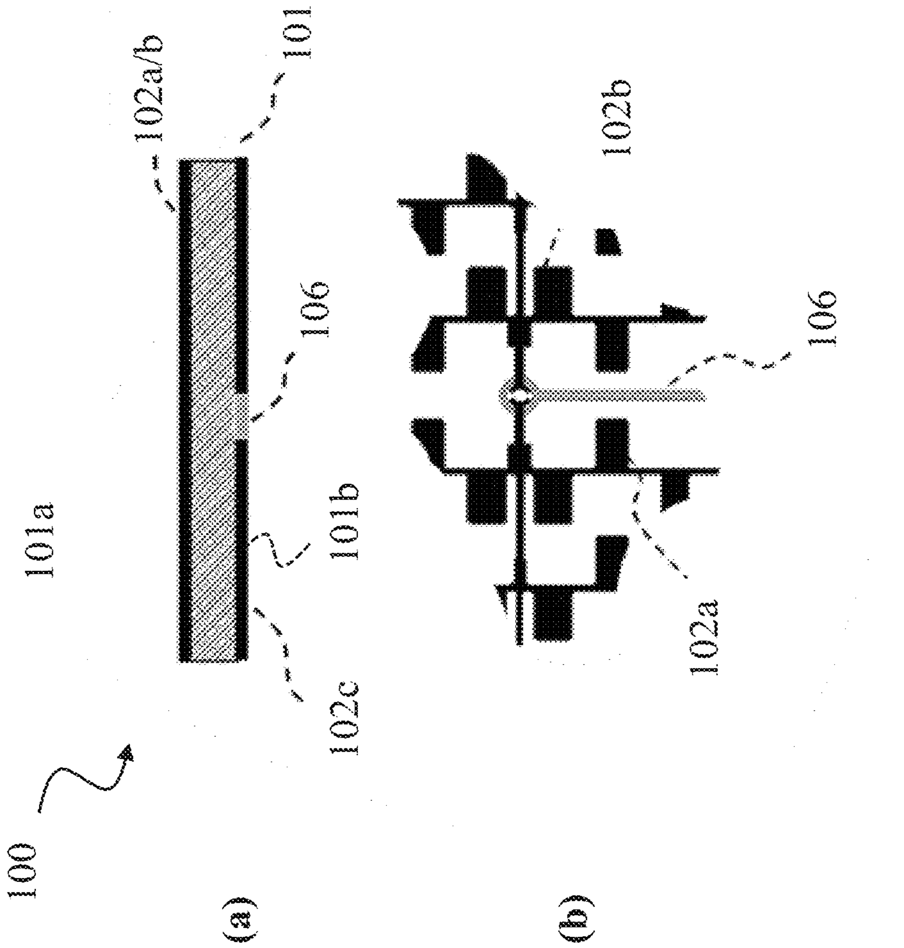
FIG. 2 shows the microstrip antenna device of FIG. 1 according to an embodiment.

FIG. 1 and FIG. 2 show a microstrip antenna device 100 according to an embodiment. FIG. 1 shows a top view of the microstrip antenna device 100, FIG. 2 (*a*) shows a side view/cross-section of the microstrip antenna device 100, and FIG. 2 (*b*) shows a portion of the microstrip antenna device 100 in the top view.

The microstrip antenna device 100 comprises a substrate 101 having a top surface 101*a* and a bottom surface 101*b*. The substrate 101 may be an electrically isolating substrate, for instance, a dielectric. Further, the antenna device 100 comprises a two-dimensional first conductive structure 102*a* and a two-dimensional second conductive structure 102*b*, arranged adjacent to each other on the top surface 101*a* of the substrate 101. The first and the second conductive structure 102*a*, 102*b* may comprise metal, and may be formed by metallization of the top surface 101*a* of the substrate 101. The antenna device 100 further comprises a two-dimensional third conductive structure 102*c*, arranged on the bottom surface 101*b* of the substrate 101 and providing an electric ground plane. Also the third conductive structure 102*c* may comprise a metal, and may be formed by metallization of the bottom surface 101*b* of the substrate 101.

The first conductive structure 102*a* comprises a first array of antennas 104*a* and a first feed network 105*a*. Each of the antennas in the first array 104*a* is connected to the first feed network 105*a*. The second conductive structure 102*b* comprises a second array of antennas 104*b* and a second feed network 105*b*. Each of the antennas in the second array 104*b* is connected to the second feed network 105*b*. Thus, the microstrip antenna device 100 may comprise an antenna array comprising the first array of antennas 104*a* and the second array of antennas 104*b*, and may comprise a feed network of this antenna array comprising the first feed network 105*a* and the second feed network 105*b*.

Further, a slot line 106 is formed in the third conductive structure 102*c*, for feeding a signal to the first feed network 105 and to the second feed network 106. Thus, the third conductive structure 102*c* serves multiple functions: it serves as a ground plane of the microstrip antenna device 100; it serves to feed the signal into the first and second feed network 105*a*, 105*b*; and it may provide terminals to, for example, an integrated distribution line or external array feeder.

According to the above, the present disclosure provides, in the microstrip antenna device 100, a feeding architecture for the antenna array comprising the first and second array of antennas 104*a*, 104*b*, which employs the ground-integrated slot line 106. This enables flexibility in choosing where the antenna array is fed, e.g., allows central feeding of the antenna array comprising the first and second arrays of antennas 104*a*, 104*b*. In particular, this is achieved with low perturbation to the radiation section of the antenna array.

Figure 3:
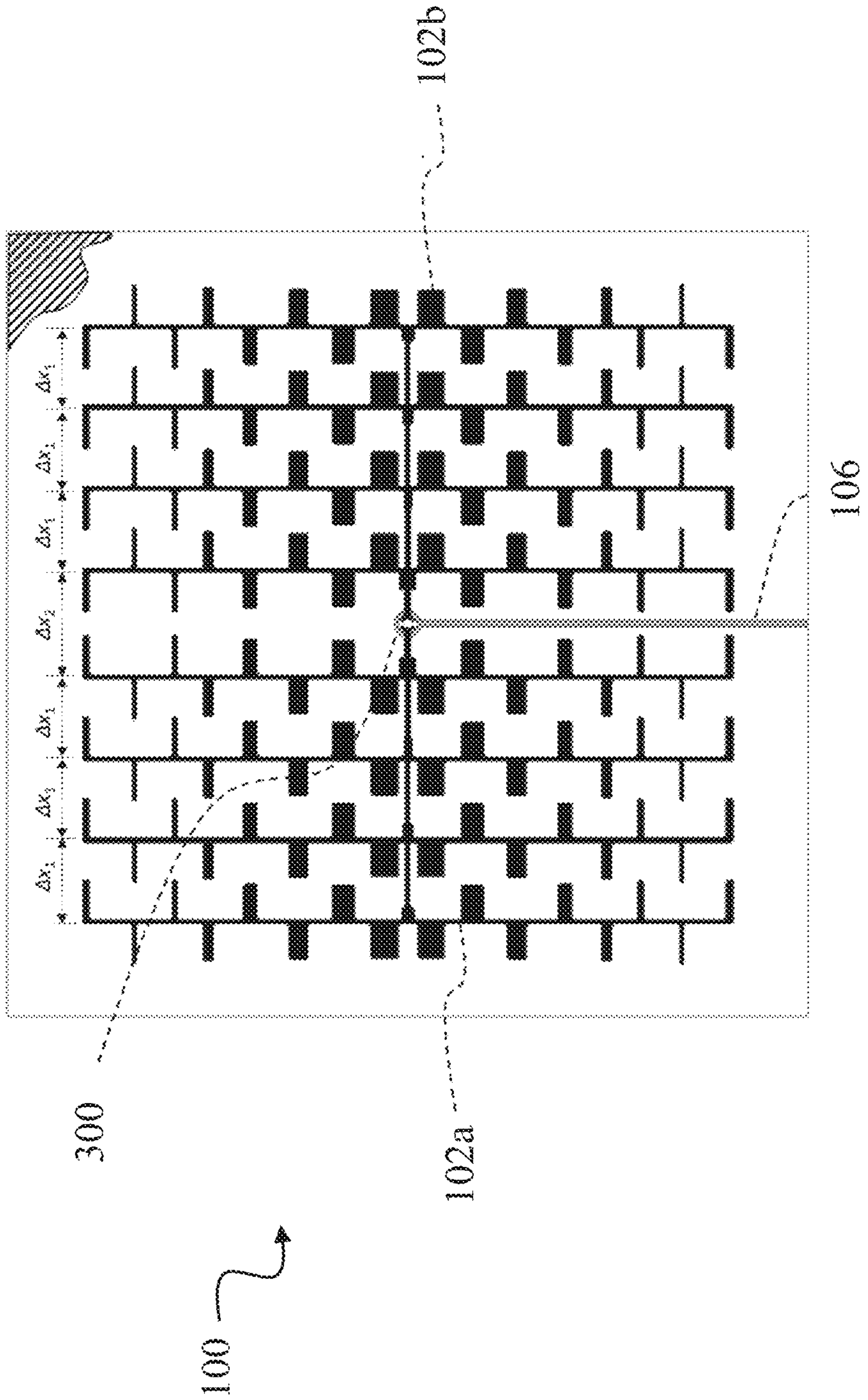
FIG. 3 shows a microstrip antenna device according to an embodiment.

FIG. 3 shows the antenna device 100 according to an embodiment, which builds on the embodiment shown in FIGS. 1 and 2. The microstrip antenna device 100 is a practical, exemplary implementation of the proposed slot line 106 feeding scheme.

In particular, as an example, an N×M microstrip antenna array is considered, which is provided on top of the substrate 101. In particular, the first and second array of antennas 104*a*. 104*b*, which form the microstrip antenna array, are both spatially periodic in a direction orthogonal to the slot line 106. More particularly, the first and second array of antennas 104*a*, 104*b* each comprise a plurality of columns of antennas, in total N columns. Each column of antennas is formed by a plurality of antennas—in this example each column includes M antennas—which are arranged one after the other along the column direction, wherein the M antennas are interconnected by secondary feed lines. In this respect, the first feed network 105*a* and the second feed network 105*b* each comprise a primary feed line and a plurality of secondary feed lines (N/2 per feed network), wherein the primary feed lines pass through a central region of the first or second array of antennas 104*a*, 104*b*, respectively, and the secondary feed lines branch off from the respective primary feed line at different branch of points.

The ground plane-integrated slot line 106 distribution circuit allows bringing the signal from an external source to the antenna array, for example, to an inner region of the antenna array. In particular, the slot line 106 may be electromagnetically coupled to the feeding networks 105*a*, 105*b* in a coupling region 300. The coupling region 300 may be located between the first array of antennas 104*a* and the second array of antennas 104*a*, particularly, it may be located centrally between these arrays 104*a*, 104*b*, more particularly, it may be in a center of the antenna array formed by the first and second array of antennas 104*a*, 104*b*. As shown in FIG. 3, the first and the second array of antennas 104*a*, 104*b* may be symmetric to each other with respect to a symmetry axis, wherein the slot line 106 may extend along this symmetry axis.

The energy transfer between the microstrip antenna array comprising the first and second array of antennas 104*a*, 104*b* and the slot line 106 may be implemented by means of a proper slot line-to-microstrip transition at the coupling region 300 (e.g., balanced or single-ended, e.g., depending on the array geometries). In particular, the energy (particularly the above-mentioned signal) can be coupled in the coupling region 300 from the slot line 106 to the first and second feeding networks 105*a*, 105*b*, and vice versa, e.g., by means of proper slot line-to-microstrip splitters (i.e. differential crossover power splitters for fully-symmetric arrays, or single-ended slot line-to-microstrip transitions for non-symmetric geometries).

Interdistances $\Delta x_1$ among the columns of antennas may be chosen to avoid the formation of strong grating lobes in the azimuth radiation pattern. The central interdistance $\Delta x_2$ between the first array of antennas 104*a* and the second array of antennas 104*b*, can be slightly different from $\Delta x_1$ to permit a sufficient clearance between the vertical slot line in the ground metallization (defined as "backbone" feeding line) and the open stubs of the central columns. In any case, also $\Delta x_2$ may be small enough to avoid non-negligible degradation of the Side Lobe Level on the azimuthal cut. For instance, $\Delta x_1$ may be 0.5-0.65 times the wavelength of operation of the microstrip antenna device 100. $\Delta x_2$ may be 0.7-0.85, in particular, 0.76-0.82, more particularly 0.79-0.80, times the wavelength of operation of the microstrip antenna device 100.

The advantage of separating the main feeding (the slot line 106) from the radiating section (the first and second array of antennas 104*a*, 104*b*) on two different layers of the substrate 101 (the top surface 101*a* and bottom surface 101*b*) leads to a clear reduction of radiation loss from the feed itself. In addition, the balanced feed of a fully symmetric antenna array, which is enabled by a central feed, induces a significant reduction of cross-polarized radiation, sensitivity to manufacturing tolerance and temperature variations, and frequency dependency of the radiation characteristics. The slot line backbone can be easily connected to any external component (e.g., transmit/receive chipset modules), for instance, by a further standard slot line/microstrip transition (in the second coupling region: e.g., realized by a second cross-over coupler), which can be arbitrarily implemented on the top surface 101*a* or bottom surface 101*b* of the substrate 101 stack-up.

The connection between the different transmission line types, which are located on two opposite faces of the substrate 101, can be implemented without the need of vertical interconnects. Indeed, the energy transfer between the conductive structures 102*a*, 102*b*, 102*c* on opposite surfaces of the substrate 101, is possible thanks to a reactive coupling mechanism, which is controlled by means of a central slot line-to-microstrip transition.

An example, which is described in the following as proof of concept for demonstrating the effects achieved by embodiments, is a microstrip antenna device 100 comprising a fully symmetric microstrip "combline" array (composed of the first and second array of antennas 104*a*, 104*b*). The horizontal and vertical amplitude taperings of the microstrip array elements (antennas) and currents are optimized to guarantee a sufficiently low level of the side lobes in the radiation pattern.

Figure 4:
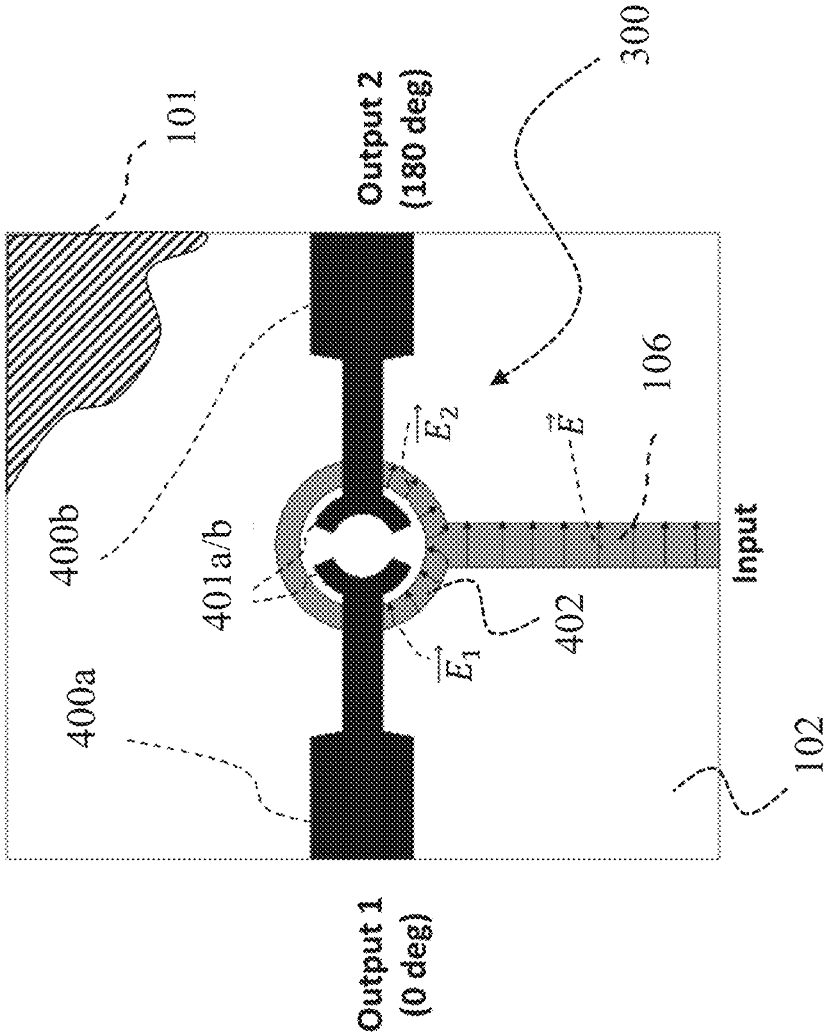
FIG. 4 shows a hybrid slot line/microstrip cross-over power splitter of a microstrip antenna device according to an embodiment.

FIG. 4 shows a cross-over power splitter, which may be used in microstrip antenna devices 100 according to embodiments, as balanced stripline-to-microstrip transition to provide a central feed to the antenna array, and transform a signal from slot line mode into microstrip mode, and vice-versa. The cross-over coupler comprises a coupling structure 401. The coupling structure 401 comprises a coupling portion 402 of the slot line 106, which may comprise an end portion of the slot line 106, and may have a circular shape as shown in FIG. 4. The coupling structure 401 may further comprise a coupling portion 401*a* of the first feed network 105*a*, which may comprise an end portion of the first feed network 105*a*, which may terminate in a first curved stub. The coupling structure 401 may also comprise a coupling portion 401*b* of the second feed network 105*b*, which may comprise and end portion of the second feed network 105*b*, which may terminate in a second curved stub. The first and the second curved stub—as shown in FIG. 4—may have the same curvature as the end portion of the slot line having the circular shape.

Figure 5:
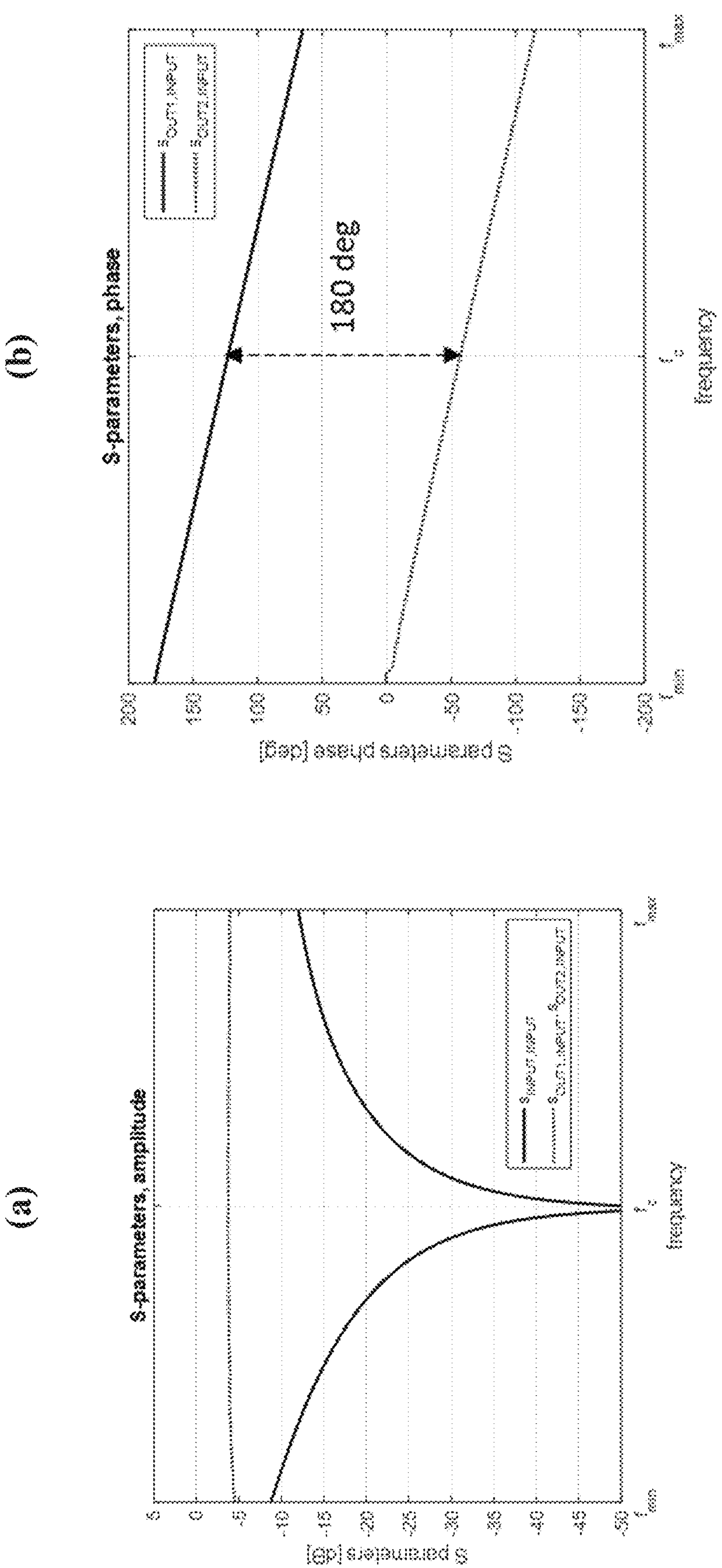
FIG. 5 shows typical S-parameters of the slot line-to-microstrip transition, as used in a microstrip antenna device according to an embodiment.

As a consequence, only a very simple stack-up is required (e.g., only one dielectric substrate 101*a* with two metallizations on top surface 101*a* and bottom surface 101*b*) with clear advantages in terms of easiness of manufacturing and cost-effectiveness. For the case at hand, the fully balanced radiating circuitry requires that the output currents, which are derived from the cross-over splitter, provide a broadband phase difference of 180° with each other, and zero amplitude unbalance. Such a behavior is easily obtained by the inversion of the electric field lines at the slot line Tee junction of the cross-over splitter. Typically, the relative impedance bandwidth of the slot line/microstrip hybrid cross-over splitter is pretty large (in the order of 50%). Typical S-parameters in amplitude and phase of the 180° cross-over power splitter are shown in FIG. 5.

Examples of radiation performances and numerical comparison are now described in the following.

Figure 6:
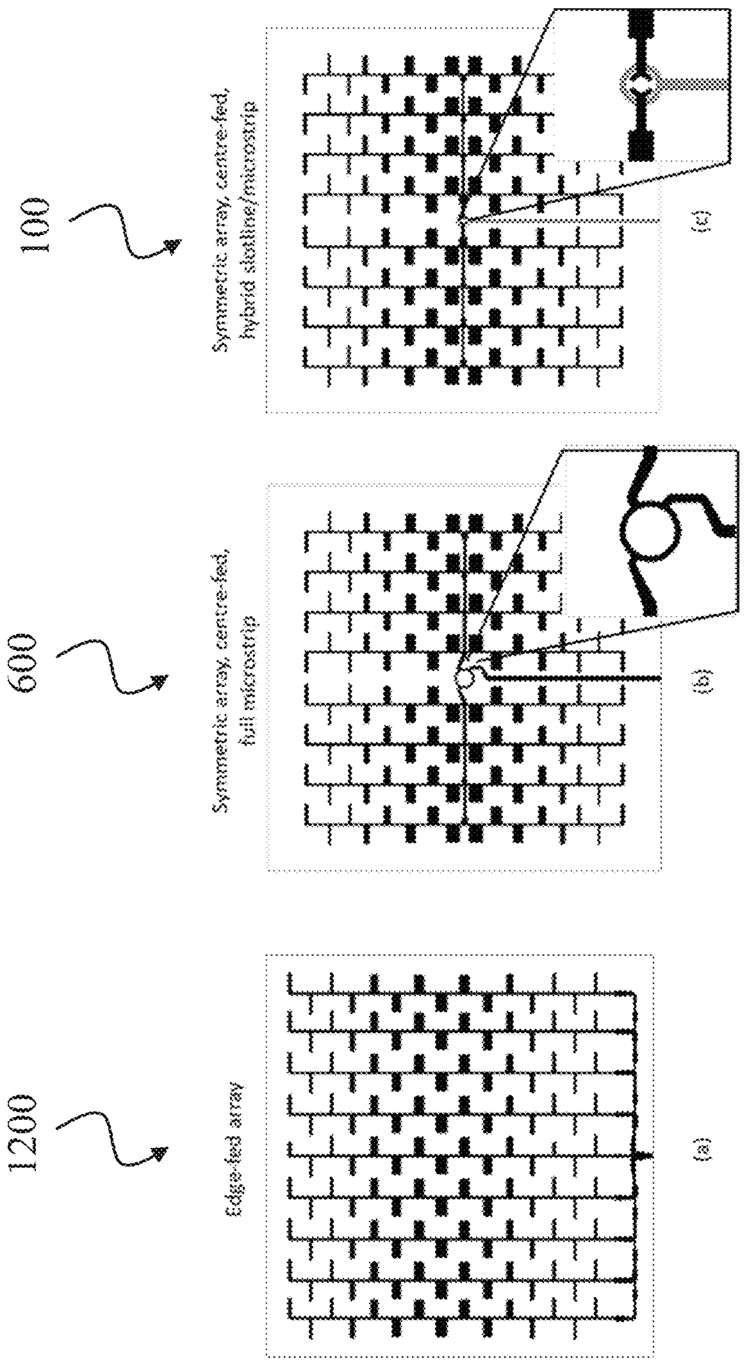
FIG. 6 shows configurations used for performance comparison in: (a) a microstrip antenna device with an edge-fed array, (b) a microstrip antenna device with a symmetric center-fed full-microstrip array, (c) a microstrip antenna device with a symmetric center-fed antenna array, with ground integrated slot line feeding network, according to an embodiment.

To this end, the configurations shown in FIG. 6 are considered: (a) a microstrip antenna device 1200 (similar to FIG. 2) comprising a 15×9 edge-fed comb line array implemented in full microstrip technology with equidistant columns at $\Delta x_1=0.65\lambda0$; (b) a microstrip antenna device 600 comprising a 16×8 center-fed symmetric comb line array with full microstrip feed having column interdistances $\Delta x_1=0.65\lambda_0$ and $\Delta x_2=0.8\lambda_0$; (c) a microstrip antenna device 100 comprising a 16×8 center-fed combline array with hybrid microstrip/slot line feed, according to an embodiment. The interdistances among columns of antennas are also $\Delta x_1=0.65\lambda_0$ and $\Delta x_2=0.8\lambda_0$. $\lambda_0$ is the wavelength of operation of the respective microstrip antenna device. All the configurations operate in the same frequency band $[f_{min}, f_{max}]$ with central frequency $f_0$. All the configurations use the same type of insulating substrate with double lamination of 17.5 μm-thick electrodeposited copper, a relative dielectric constant $\varepsilon_r=3$, loss tangent tan $\delta=0.001$, and substrate thickness h=0.127 mm. The center-fed array in full-microstrip technology (FIG. 6 (*b*)) would use a similar architecture as the microstrip/slot line hybrid array (FIG. 6 (*c*)) with just a replacement of all slot line-based components (vertical backbone slot line and cross-over splitter ring) with their microstrip counterparts.

The results described below demonstrate that the ground-integrated slot line feed according to embodiments provides way better radiation performance than fully coplanar microstrip either side or central feeding.

Figure 7:
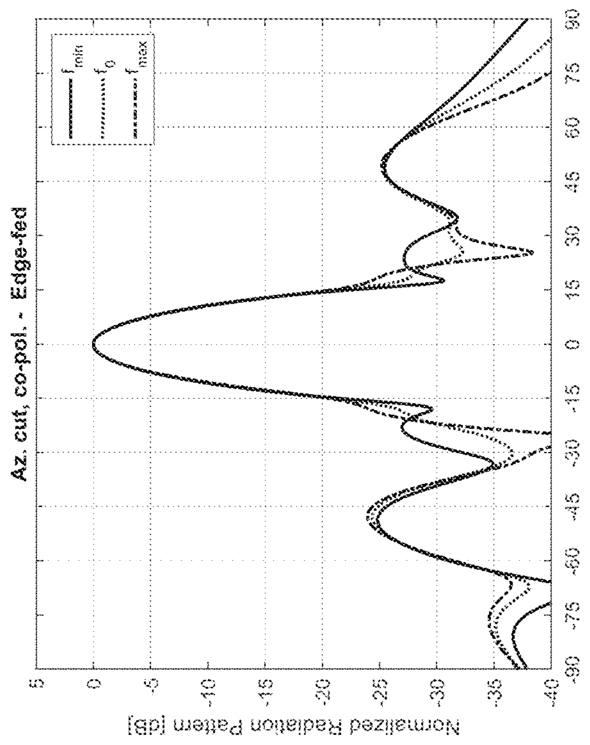
FIG. 7 shows normalized radiation patterns of the microstrip antenna device comprising the edge-fed array at different frequencies for: (a) azimuth, (b) elevation.
Figure 7:
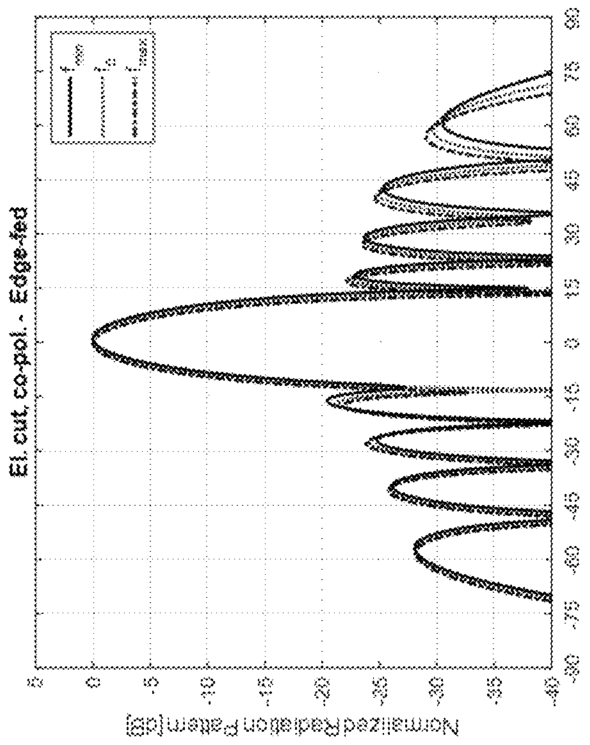
Figure 8:
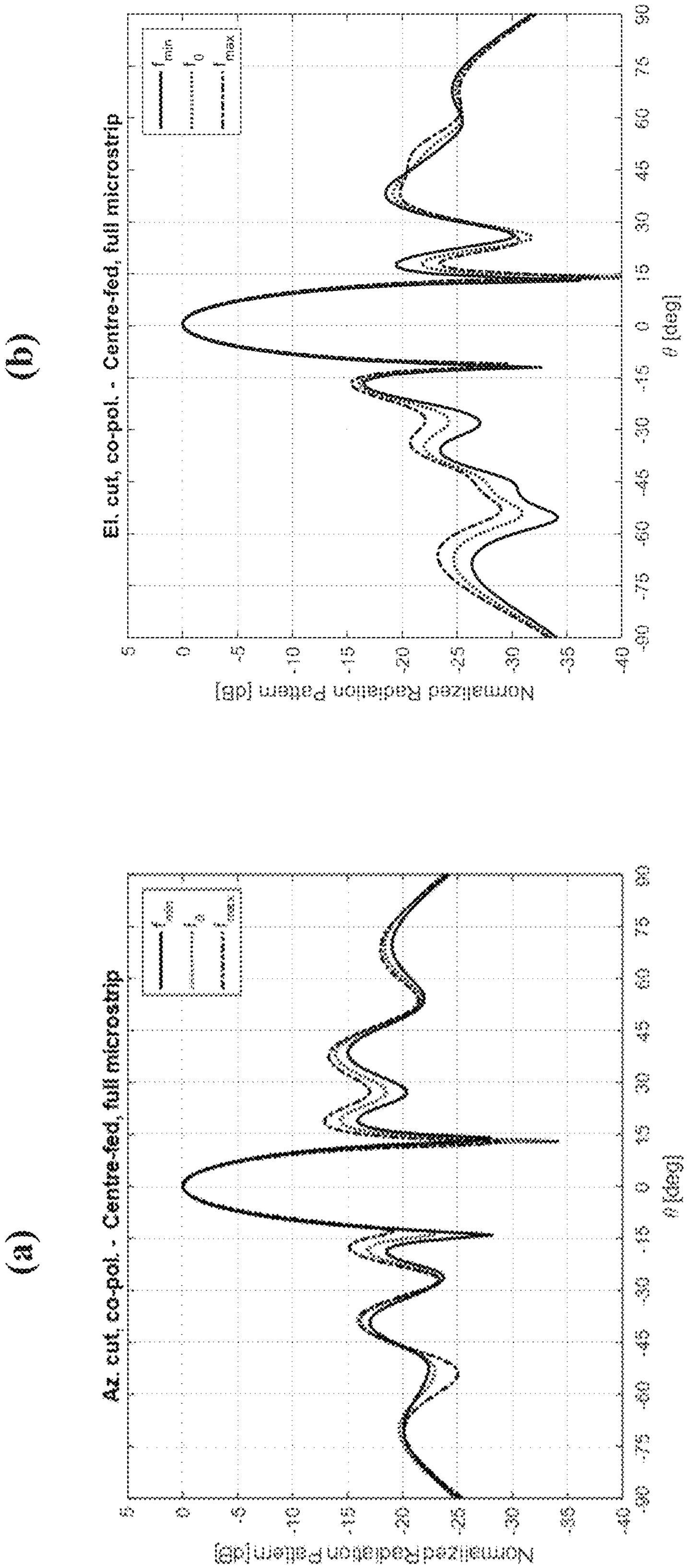
FIG. 8 shows normalized radiation patterns of the microstrip antenna device comprising the center-fed full-microstrip array at different frequencies for: (a) azimuth, (b) elevation.
Figure 9:
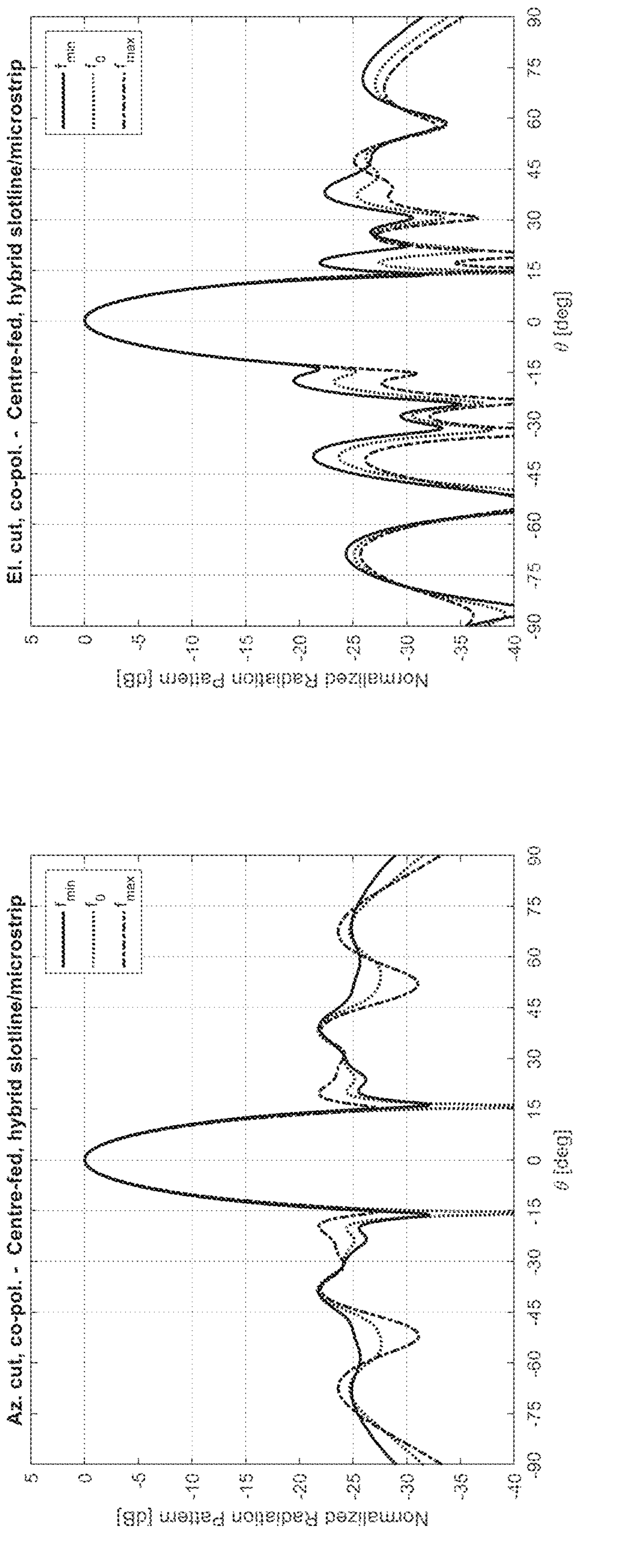
FIG. 9 shows normalized radiation patterns of the microstrip antenna device comprising the symmetric center-fed antenna array, with ground integrated slot line feeding network, e according to an embodiment at different frequencies for: (a) azimuth, (b) elevation.

Radiation patterns in FIG. 7, FIG. 8, and FIG. 9 show the behavioral comparison of the three configurations at different frequencies $f_{min}$, $f_0$, and $f_{max}$ within a total relative bandwidth of 1.3%. FIG. 7 (*a*) and (*b*) show the azimuth and elevation normalized radiation patterns of the edge-fed array (as in FIG. 6 (*a*)). As expected, the edge-feed suffers from an intrinsic beam squint of about 2° from $f_{min}$ to $f_{max}$. In wideband radar applications, the relative bandwidth might reach about 6.5%, hence the total frequency-dependent beam squint could be in the order of 10°.

FIG. 8 (*a*) and (*b*) show the azimuth and elevation normalized radiation patterns of the center-fed full-microstrip array (as in FIG. 6 (*b*)). Even though the beam squint is completely eliminated, it suffers from strong and asymmetric spurious radiation of the backbone microstrip feeding line. Moreover, the asymmetric microstrip cross-over divider has different coupling levels towards its neighboring left-hand column with respect to the closest column on its right-hand side. Those effects lead to a significant asymmetries of the radiated pattern and degradation of the side lobe suppression level.

FIG. 9 (*a*) and (*b*) show the azimuth and elevation normalized radiation patterns of microstrip antenna devices 100 according to embodiments, namely the center-fed hybrid slot line/microstrip array (as in FIG. 6 (*c*)). As expected, the beam squint is completely eliminated across the frequency bandwidth, and radiation from the backbone slot line is much weaker compared to the full-microstrip configuration. The slot line is weakly coupled to the central columns, therefore both azimuth and elevation patterns are much more balanced than the full-microstrip architecture.

Figure 10:
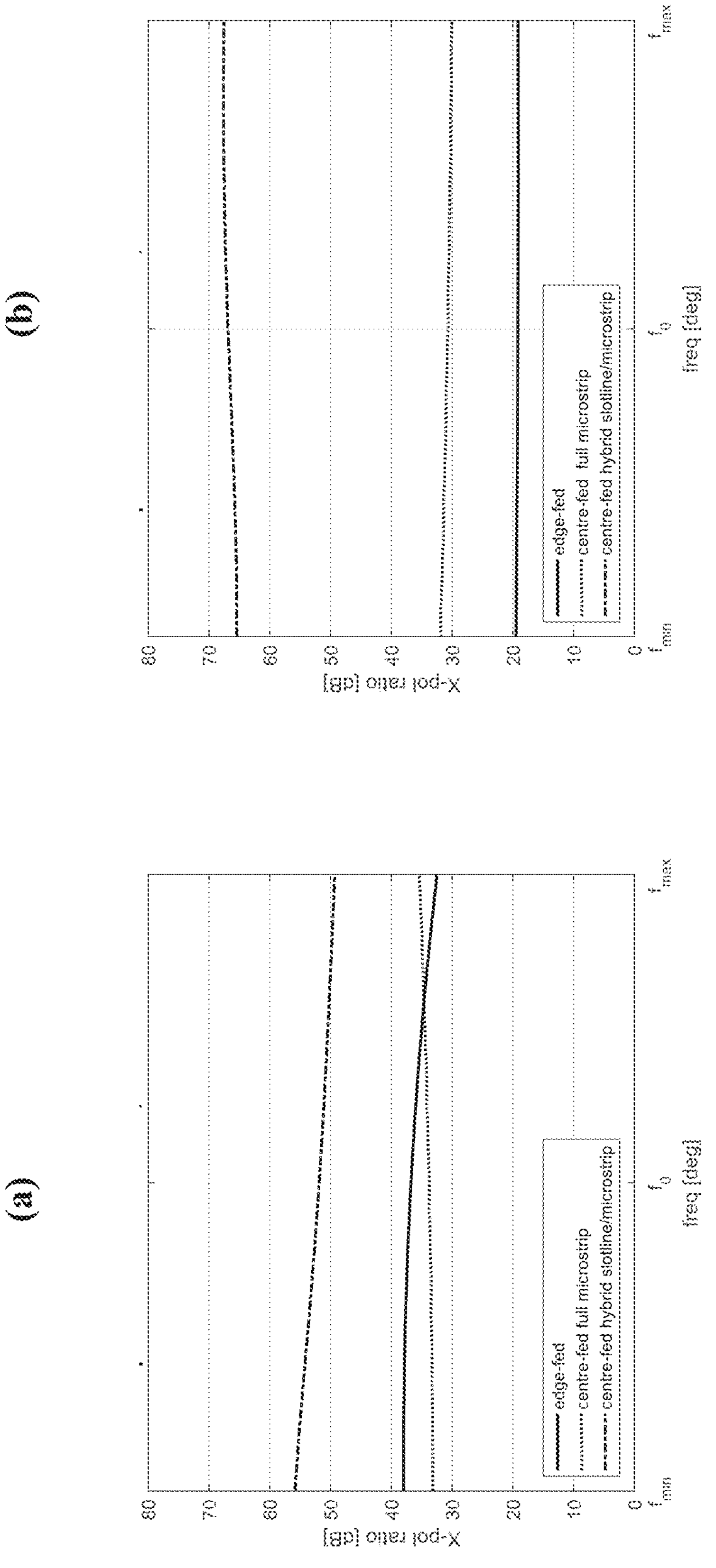
FIG. 10 shows co-polar to cross-polar ratios in the main beam of microstrip antenna devices comprising different arrays in: (a) azimuth plane, (b) elevation plane.

As for the co-polar to cross-polar ratio (X-pol ratio), it is clear that the edge-fed array (as in FIG. 6 (*a*)) provides the worst performances, as is demonstrated in FIG. 10. The azimuth performances of edge-fed and full microstrip center-fed array (as in FIG. 6 (*b*)) are similar, whilst the architecture of the microstrip antenna device 100 according to an embodiment (as in FIG. 6 (*c*)) provides an average improvement of more than 15 dB. In the elevation plane, the differences are much more evident: the edge-fed array suffers from the unbalanced feed and radiation from the vertical microstrip lines of each column, therefore the X-pol ratio does not exceed 19 dB. The full-microstrip center-fed array, thanks to the balanced feed at each column, allows an improvement up to about 30 dB. Nevertheless, it still suffers from the second order radiation effect from the backbone microstrip line, which conducts a vertical current that radiates a spurious cross-polarized field. The best X-pol ratio in the elevation plane is provided by the balanced architecture with ground-integrated slot line 106 according to the embodiments. Indeed, thanks to both the low spurious radiation from the slot line and the advantage of the balanced feeding, the X-pol ratio in elevation reaches values above 60 dB.

The proposed embodiments, compared to a multi-layer approach to feed the center of the array with ground-shielded feeding line (spurious coupling to the radiating elements and unwanted radiation from the feed), minimizes the number of manufacturing steps. Indeed, it helps reducing the stack-up complexity from four to two layers, leading to a considerable reduction in mass production costs and misalignment tolerances between multiple layers.

Figure 11:
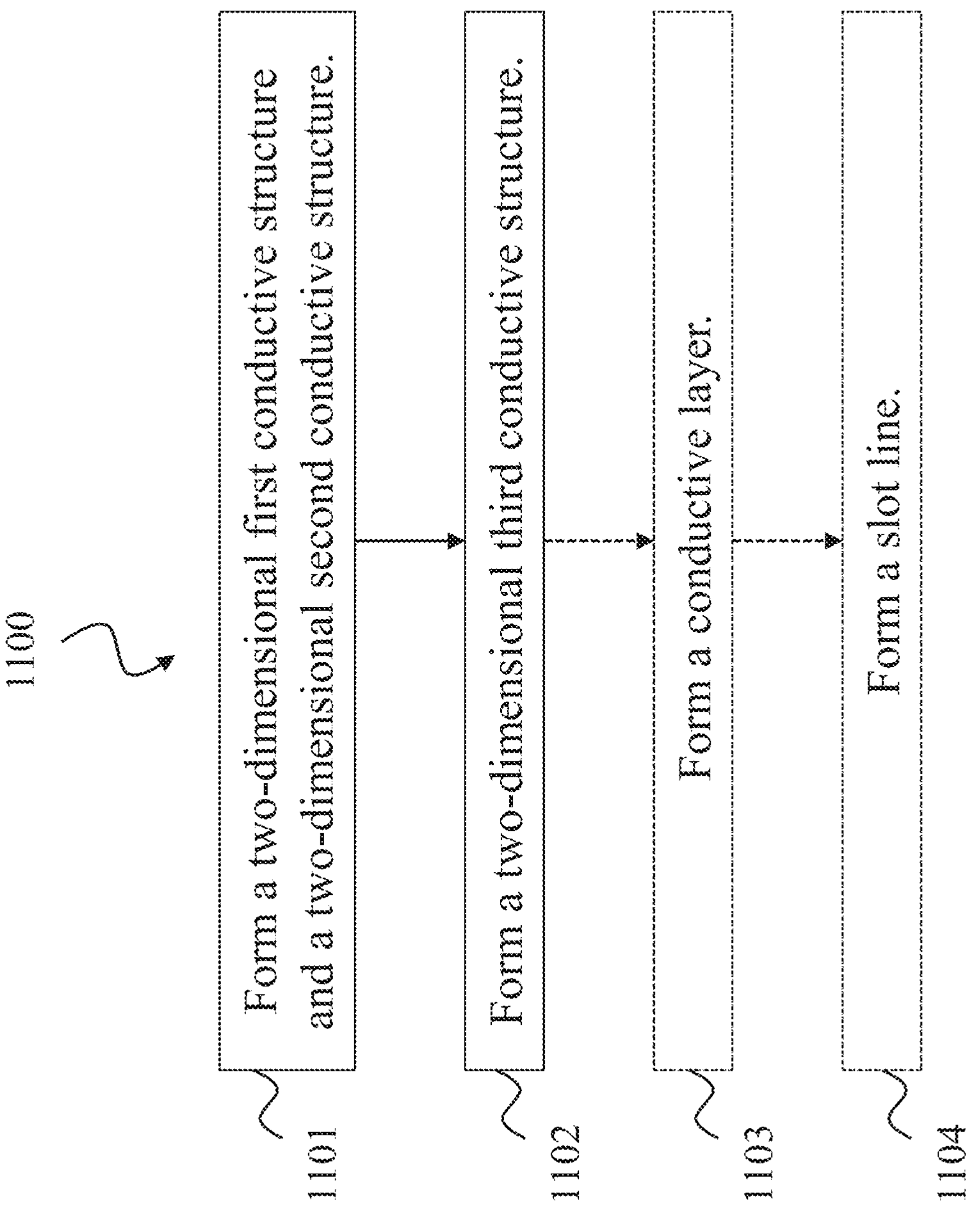
FIG. 11 shows a method for producing a microstrip antenna device, according to an embodiment.
Figure 12:
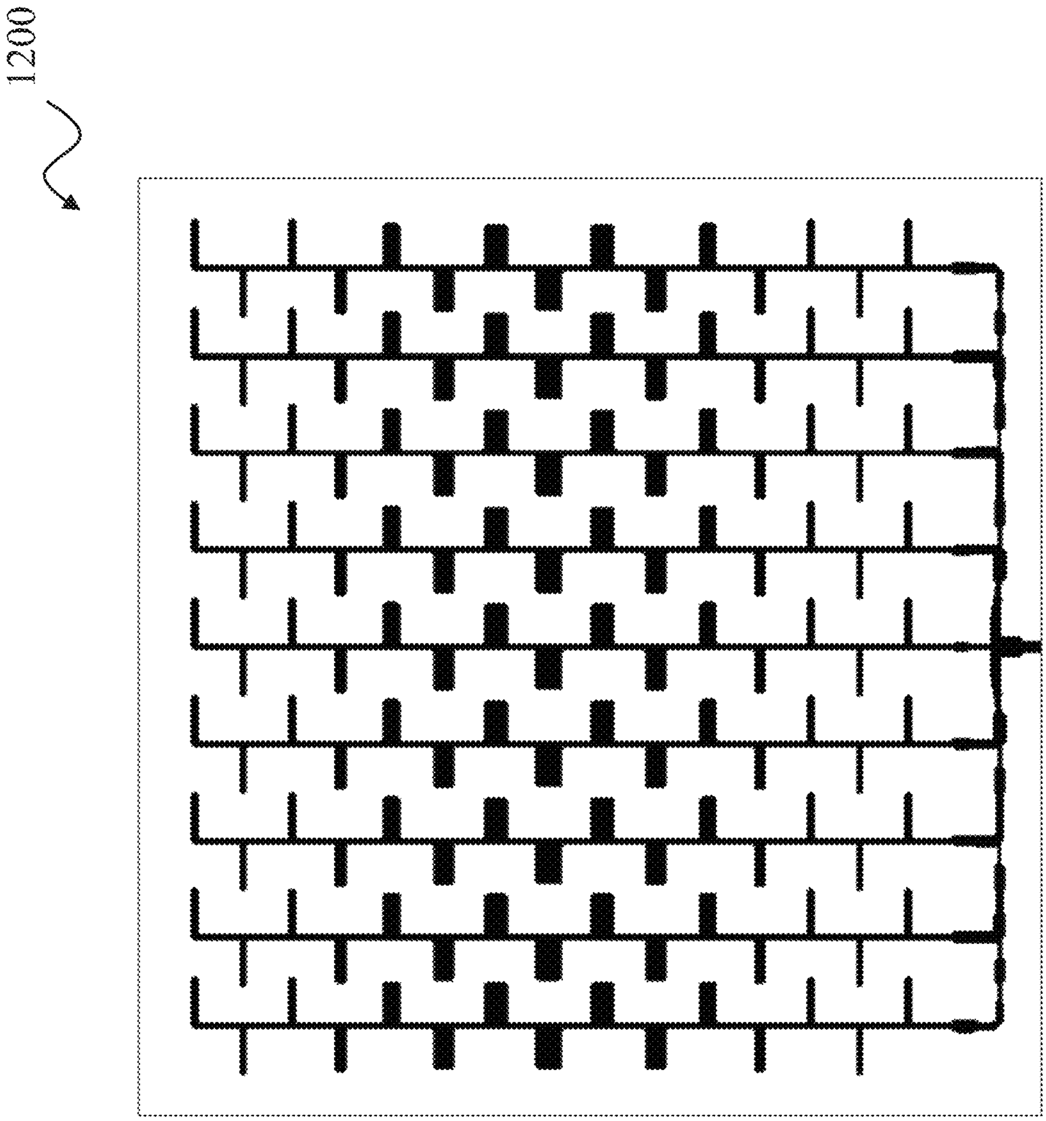
FIG. 12 shows an example of a microstrip antenna device with an edge-fed array.
Figure 13:
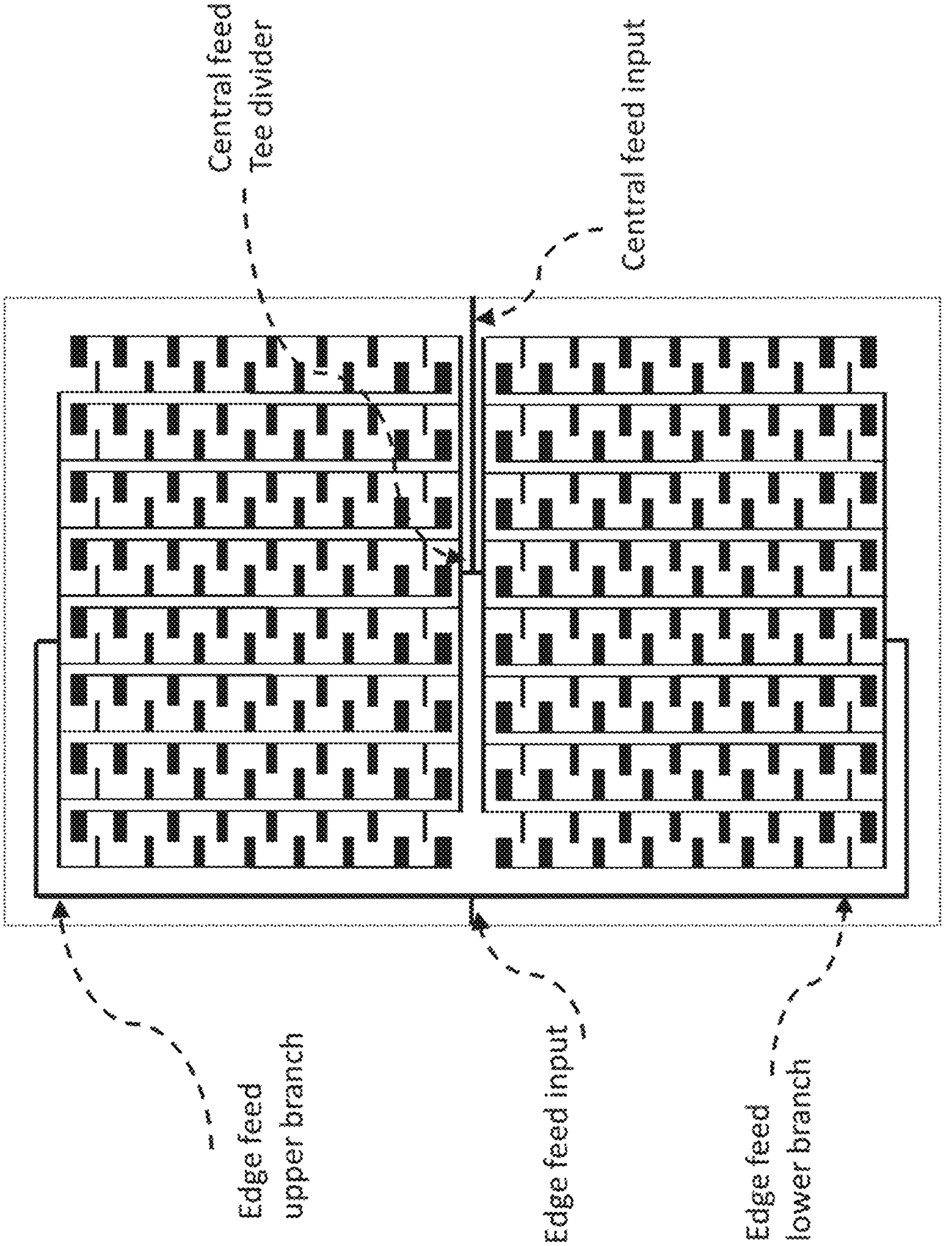
FIG. 13 shows an example of a microstrip antenna device with an interleaved center/edge-fed combline array.

In this respect, FIG. 11 shows a method 1100 for manufacturing the microstrip antenna device 100 according to an embodiment. The method 1100 comprises a step 1101 of forming a two-dimensional first conductive structure 102*a* and a two-dimensional second conductive structure 102*b* adjacent to each other on a top surface 101*a* of a substrate 100. The first conductive structure 102*a* comprises a first array of antennas 104*a* and a first feed network 105*a*. The second conductive structure 102*b* comprises a second array of antennas 104*b* and a second feed network 105*b*, wherein each of the antennas in the first array 104*a* is connected to the first feed network 105*a*, and each of the antennas in the second array 104*b* is connected to the second feed network 105*b*.

The method 1100 further comprises a step 1102 of forming a two-dimensional third conductive structure 102*c* on a bottom surface 101*b* of the substrate 101, in order to provide an electric ground plane. The forming 1102 of the two-dimensional third conductive structure comprises a step 1103 of forming a conductive layer on the bottom surface 101*b* of the substrate 101, and a step 1104 of forming a slot line 106 in the conductive layer, the slot line 106 being suitable for feeding a signal to the first feed network 105*a* and to the second feed network 105*b*.

To summarize, the advantages of the embodiments of the present disclosure include:

The embedded slot line 106 reduces the spurious radiation and interference towards the arrays of antennas 104*a*, 104*b*.

Enhanced radiative performances of the arrays of antennas 104*a*, 104 that use such ground-integrated slot line central feeding (no frequency dependence of the main beam direction, symmetric side lobes, low cross-polarization).

The slot line feeding also enables an easier and effective design of a fully symmetric microstrip antenna array (comprising first and second array of antennas 104*a*, 104*b*) with central feeding, leading to an improved robustness to tolerance variations (i.e. etching tolerance, substrate height, etc.).

The stack-up is maintained cost-effective and simple, since the hybrid microstrip/slot line structure do only require one dielectric substrate to avoid unwanted cross-coupling between feeding line and array elements The present invention has been described in conjunction with various embodiments as examples as well as implementations. However, other variations can be understood and effected by those persons skilled in the art and practicing the claimed invention, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. A microstrip antenna device, comprising:

a substrate having a top surface and a bottom surface, a two-dimensional first conductive structure and a two-dimensional second conductive structure arranged adjacent to each other on the top surface of the substrate, and a two-dimensional third conductive structure arranged on the bottom surface of the substrate and providing an electric ground plane, wherein the first conductive structure comprises a first array of antennas and a first feed network, each respective antenna in the first array of antennas being connected to the first feed network, wherein the second conductive structure comprises a second array of antennas and a second feed network, each respective antenna in the second array of antennas being connected to the second feed network, wherein a slot line is formed in the third conductive structure for feeding a signal to both the first feed network and the second feed network, wherein the first feed network and the second feed network are electromagnetically coupled to the slot line in a coupling region, wherein the slot line is coupled to the first feed network and to the second feed network, in the coupling region, via a coupling structure, and wherein the coupling structure comprises a coupling portion of the slot line, a coupling portion of the first feed network, and a coupling portion of the second feed network.

2. The microstrip antenna device according to claim 1, wherein the coupling region is located between the first array of antennas and the second array of antennas.

3. The microstrip antenna device according to claim 1, wherein the coupling region is located centrally between the first array of antennas and the second array of antennas.

4. The microstrip antenna device according to claim 1, wherein the coupling structure comprises a cross-over coupler.

5. The microstrip antenna device according to claim 1, wherein the coupling portion of the slot line comprises an end portion of the slot line, the end portion of the slot line having a circular shape, wherein the coupling structure of the first feed network comprises an end portion of the first feed network, the end portion of the first feed network terminating in a first curved stub, and wherein the coupling structure of the second feed network comprises an end portion of the second feed network, the end portion of the second feed network terminating in a second curved stub, wherein the first and second curved stubs and the end portion of the slot line have the same curvature.

6. The microstrip antenna device according to claim 1, wherein the first curved stub and the second curved stub are located above an inner region of the circular shape of the end portion of the slot line.

7. The microstrip antenna device according to claim 1, wherein the first array of antennas and the second array of antennas are symmetric to each other with respect to a symmetry axis.

8. The microstrip antenna device according to claim 1, wherein the antennas of the first array of antennas are arranged in a first lattice and the antennas of the second array are arranged in a second lattice.

9. The microstrip antenna device according to claim 8, wherein the first array of antennas is a first microstrip combline antenna array and the second array of antennas is a second microstrip combline antenna array.

10. A microstrip antenna device, comprising:

a substrate having a top surface and a bottom surface, a two-dimensional first conductive structure and a two-dimensional second conductive structure arranged adjacent to each other on the top surface of the substrate, and a two-dimensional third conductive structure arranged on the bottom surface of the substrate and providing an electric ground plane, wherein the first conductive structure comprises a first array of antennas and a first feed network, each respective antenna in the first array of antennas being connected to the first feed network, wherein the second conductive structure comprises a second array of antennas and a second feed network, each respective antenna in the second array of antennas being connected to the second feed network, wherein a slot line is formed in the third conductive structure for feeding a signal to both the first feed network and the second feed network, wherein the first feed network comprises a primary feed line and a plurality of secondary feed lines, the primary feed line passing through a central region of the first array of antennas, and the secondary feed lines branching off from the primary feed line at different branch-off points, and wherein the second feed network comprises a primary feed line and a plurality of secondary feed lines, the primary feed line passing through a central region of the second array of antennas, and the secondary feed lines branching off from the primary feed line at different branch-off points.

11. The microstrip antenna device according to claim 10, wherein the first array of antennas and the second array of antennas are symmetric to each other with respect to a symmetry axis.

12. The microstrip antenna device according to claim 11, wherein a coupling structure comprises a coupling portion of the slot line, a coupling portion of the first feed network, and a coupling portion of the second feed network, and wherein the coupling structure is configured to introduce a 180° phase shift between the signal in the first feed network and the signal in the second feed network.

13. The microstrip antenna device according to claim 11, wherein: the slot line extends along the symmetry axis.

14. The microstrip antenna device according to claim 10, wherein the first conductive structure and the second conductive structure are separated from each other by a distance in a range of 0.7-0.85 times a wavelength of operation of the microstrip antenna device.

15. The microstrip antenna device according to claim 10, wherein the first array of antennas and the second array of antennas are both spatially periodic in a direction orthogonal to the slot line, with a spatial period in a range of 0.5-0.65 times a wavelength of operation of the microstrip antenna device.

16. The microstrip antenna device according to claim 10, wherein the antennas of the first array of antennas are arranged in a first lattice and the antennas of the second array are arranged in a second lattice.

17. The microstrip antenna device according to claim 16, wherein the first array of antennas is a first microstrip combline antenna array and the second array of antennas is a second microstrip combline antenna array.

18. A radar device comprising a microstrip antenna device according to claim 10.

19. A method for producing a microstrip antenna device, the method comprising:

forming a two-dimensional first conductive structure and a two-dimensional second conductive structure adjacent to each other on a top surface of a substrate, the first conductive structure comprising a first array of antennas and a first feed network, the second conductive structure comprising a second array of antennas and a second feed network, each respective antenna in the first array of antennas being connected to the first feed network, each respective antenna in the second array of antennas being connected to the second feed network, and forming a two-dimensional third conductive structure on a bottom surface of the substrate in order to provide an electric ground plane, wherein forming the two-dimensional third conductive structure comprises:

forming a conductive layer on the bottom surface of the substrate, and forming a slot line in the conductive layer, the slot line being suitable for feeding a signal to the first feed network and to the second feed network, wherein the first feed network comprises a primary feed line and a plurality of secondary feed lines, the primary feed line passing through a central region of the first array of antennas, and the secondary feed lines branching off from the primary feed line at different branch-off points, and wherein the second feed network comprises a primary feed line and a plurality of secondary feed lines, the primary feed line passing through a central region of the second array of antennas, and the secondary feed lines branching off from the primary feed line at different branch-off points.

20. The method of claim 19, wherein forming the slot line comprises removing conductive material from the conductive layer along a line.

* * * * *